United States Patent
Wels et al.

(10) Patent No.: US 10,309,447 B2
(45) Date of Patent: Jun. 4, 2019

(54) METHOD FOR MACHINING A SURFACE OF A METAL COMPONENT, AND METAL COMPONENT

(71) Applicants: Dr. Ing. h.c. F. Porsche Akteingesellschaft, Stuttgart (DE); Gehring Technologies GmbH, Ostfildern (DE)

(72) Inventors: Peter Wels, Schwieberdingen (DE); Gerhard Flores, Ostfildern (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 15/468,686

(22) Filed: Mar. 24, 2017

(65) Prior Publication Data
US 2017/0284454 A1    Oct. 5, 2017

(30) Foreign Application Priority Data

Mar. 31, 2016 (DE) .......... 10 2016 205 393
Feb. 2, 2017 (DE) .......... 10 2017 201 648

(51) Int. Cl.
*B23K 26/362* (2014.01)
*F16C 7/02* (2006.01)
(Continued)

(52) U.S. Cl.
CPC .......... *F16C 7/023* (2013.01); *B21D 53/84* (2013.01); *B23K 26/0626* (2013.01);
(Continued)

(58) Field of Classification Search
CPC .......... B23K 26/362; B23K 26/0626; B23K 26/352; B23K 26/355; B23K 26/3584; B23K 26/40
See application file for complete search history.

(56) References Cited

U.S. PATENT DOCUMENTS 4,996,113 A    2/1991   Hector et al.
6,163,010 A *  12/2000  Kobsa .......... B23K 26/032
                                           219/121.61
(Continued)

FOREIGN PATENT DOCUMENTS

CN    1812866 A    8/2006
CN    103998178 A  8/2014
(Continued)

OTHER PUBLICATIONS

Roach et al., "progress in superhydrophobic surface development", Oct. 2007, The Royal Society of Chemistry, vol. 4, pp. 224-240.*
(Continued)

*Primary Examiner* — Geoffrey S Evans
(74) *Attorney, Agent, or Firm* — RatnerPrestia

(57) ABSTRACT

A method for machining a surface of a metal component, in particular a connecting rod or a cam for a motor vehicle, including the following steps: providing a metal component which has a surface to be machined; premachining the surface to be machined; structuring the premachined surface by a laser beam in such a way that elevations but no depressions are formed as laser structures on the premachined surface with respect to the level thereof.

16 Claims, 4 Drawing Sheets

(51) Int. Cl.
  *B23K 26/06* (2014.01)
  *B21D 53/84* (2006.01)
  *F16H 53/02* (2006.01)
  *F16C 33/12* (2006.01)
  *F16C 33/14* (2006.01)
  *B23K 101/00* (2006.01)
  *B23K 103/04* (2006.01)
  *B23K 103/14* (2006.01)

(52) U.S. Cl.
  CPC ............ *B23K 26/362* (2013.01); *F16C 33/12* (2013.01); *F16C 33/14* (2013.01); *F16H 53/025* (2013.01); *B23K 2101/006* (2018.08); *B23K 2103/04* (2018.08); *B23K 2103/14* (2018.08); *F16C 2204/42* (2013.01); *F16C 2204/60* (2013.01); *F16C 2220/60* (2013.01); *F16C 2223/02* (2013.01); *F16C 2240/42* (2013.01)

(56) References Cited

U.S. PATENT DOCUMENTS

| | | | |
|---|---|---|---|
| 6,554,854 B1* | 4/2003 | Flanagan | B23K 26/244 623/1.1 |
| 7,290,936 B2 | 11/2007 | Tsuji et al. | |
| 7,389,666 B2 | 6/2008 | Lugt | |
| 8,607,456 B1 | 12/2013 | Lebret et al. | |
| 2003/0006217 A1* | 1/2003 | Dance | B23K 15/08 219/121.18 |
| 2005/0103763 A1* | 5/2005 | Momose | B23K 26/0643 219/121.69 |
| 2005/0155451 A1* | 7/2005 | Abeln | F16C 9/04 74/579 R |
| 2009/0001058 A1 | 1/2009 | Lentz | |
| 2009/0083979 A1 | 4/2009 | Lebret et al. | |
| 2009/0326671 A1* | 12/2009 | Schofield | A61B 17/1659 623/23.5 |
| 2011/0086204 A1* | 4/2011 | Wohl, Jr. | B23K 26/0081 428/156 |
| 2011/0118049 A1* | 5/2011 | Simpson | A63B 49/08 473/316 |
| 2011/0138604 A1 | 6/2011 | Zimmermann et al. | |
| 2014/0067031 A1* | 3/2014 | Petersen | B23K 26/0084 607/116 |
| 2015/0064407 A1 | 3/2015 | Bruck et al. | |
| 2015/0113778 A1 | 4/2015 | Schreiber et al. | |
| 2016/0037650 A1 | 2/2016 | Ostholt et al. | |
| 2016/0129526 A1* | 5/2016 | Russ | B23K 26/0869 264/400 |
| 2016/0273576 A1 | 9/2016 | Schreiber et al. | |

FOREIGN PATENT DOCUMENTS

| | | |
|---|---|---|
| DE | 10325910 A1 | 2/2004 |
| EP | 1420177 A1 | 5/2004 |
| EP | 2336586 A1 | 6/2011 |
| JP | 01317605 A | 12/1989 |
| JP | 04167906 A | 6/1992 |
| JP | 07001165 A | 1/1995 |
| JP | 10128481 A | 5/1998 |
| JP | 2005049150 A | 2/2005 |
| JP | 2005249150 A | 9/2005 |
| JP | 2005321048 A | 11/2005 |
| JP | 2007270919 A | 10/2007 |
| JP | 2015177900 A | 10/2015 |
| JP | 2016507642 A | 3/2016 |
| JP | 2016532835 A | 10/2016 |
| WO | 2012000106 A1 | 1/2012 |
| WO | 2016018808 A1 | 2/2016 |

OTHER PUBLICATIONS

Great Britain Combined Search and Examination Report for GB Application No. 1704544.4 dated Oct. 5, 2017, 9 pages.
Notification of Reasons for Rejection for Japanese Application No. 2017-064662, dated Jan. 30, 2018, including English translation, 8 pages.
Austrian Office Action for Austrian Application No. 2B A 43/2017, dated May 7, 2018, with translation, 5 pages.
Chinese Search Report for Chinese Application No. 201710203198. 7, dated Aug. 29, 2018, 2 pages.

\* cited by examiner

METHOD FOR MACHINING A SURFACE OF A METAL COMPONENT, AND METAL COMPONENT

CROSS-REFERENCE TO RELATED APPLICATIONS

This application claims priority to German Patent Application Nos. 102017201648.5, filed Feb. 2, 2017 and 102016205393.0, filed Mar. 31, 2016, the contents of such applications being incorporated by reference herein in their entirety.

FIELD OF THE INVENTION

The present invention relates to a method for machining a surface of a metal component, in particular a connecting rod or a cam for a motor vehicle, comprising the following steps: providing a metal component which has a surface to be machined, premachining the surface to be machined, and structuring the premachined surface by means of a laser beam. Furthermore, the invention relates to a metal component, in particular a connecting rod or a cam for a motor vehicle.

BACKGROUND OF THE INVENTION

A corresponding method for incorporating structures into a surface of a connecting rod is known from DE 103 25 910 B4, which is incorporated by reference herein and from EP 1 420 177 B1, which is incorporated by reference herein. In those documents, the respective premachined surface is laser-structured by means of a laser beam in such a way that elevations and depressions are formed as laser structures on the premachined surface with respect to the level thereof. It has been shown that such laser structuring is disadvantageous for the service life of the components.

EP 2 336 586 A1, which is incorporated by reference herein, discloses a method for producing a press fit of a component having a mounting hole on a shaft. An inner surface of the mounting hole in the component and/or a lateral surface of the shaft are partially melted in order to form dome-like projections. The projections solidify after cooling. Depressions are also formed during the formation of the projections.

It is generally known in motor vehicle drive technology for components which are mechanically subjected to a high degree of stress to be increasingly manufactured from titanium, since titanium has a high strength and at the same time a lower weight than, for example, steel. However, owing to the material hardness of the titanium, the surfaces of such titanium components have to be laboriously machined in order to have the corresponding surface properties, with the surfaces being either mechanically smoothed to achieve a minimization of friction or wear, or having to be roughened in order to have a corresponding coefficient of friction.

It is an object of the present invention to provide a method whereby a surface of a component, in particular a titanium component, can be structured with little effort on the one hand and there is no risk on the other hand that the service life of the component is reduced. Furthermore, it is intended for such a component to be provided.

SUMMARY OF THE INVENTION

This object is achieved in the method stated at the outset in that the premachined surface is structured by means of a laser beam in such a way that elevations but no depressions are formed as laser structures with respect to the level of the premachined surface.

By virtue of the fact that the surface to be machined is structured according to aspects of the invention by means of a laser beam in such a way that elevations but no depressions are formed as laser structures with respect to the level of the premachined surface, a defined roughness can be generated contactlessly with little expenditure of time on the surface, in particular also on a titanium surface, to be precise without the risk that the service life of the component is reduced.

The elevations establish a defined roughness to increase the static friction. For increasing the static friction, non-functional-relevant depressions, which can reduce the service life of the component, are avoided according to aspects of the invention.

The surface to be machined is preferably an inner surface of an aperture in the metal component, wherein the laser beam is guided in a direction orthogonal to a circumferential direction of the inner surface. Consequently, the poorly accessible inner surface can be structured with little effort, it being possible by guiding the laser beam in the direction orthogonal to the circumferential direction for a friction value of the surface to be machined to be significantly increased in the circumferential direction.

In a preferred embodiment, the laser beam is guided in a pulsed manner along at least one machining track over the surface to be machined. As a result, local melting of the surface is possible, whereby particularly effective structuring of the surface of the metal component can be achieved.

The metal component is preferably a titanium component, in particular a titanium connecting rod, the premachined titanium surface of which is laser-structured with an average beam power of the preferably pulsed laser beam of 8±0.5 watt.

Alternatively, the metal component is a steel component, in particular a steel connecting rod, the premachined steel surface of which is laser-structured with an average beam power of the preferably pulsed laser beam of 9±0.5 watt.

Such a material-dependent, average beam power of the preferably pulsed laser beam makes it possible to ensure that elevations but no depressions are formed as laser structures on the premachined surface with respect to the level thereof.

The laser beam is moved in machining tracks along the surface to be machined. It is particularly preferred if the elevations on the surface to be machined are formed in an overlapping manner in one and the same machining track of the laser beam and have an overlap of ≥60%, in particular of 60-80%. Consequently, a high structuring density of the surface is possible, with the result that a significant increase in the friction value of the surface can be achieved.

In a preferred embodiment, the elevations overlapping one another in the respective machining track of the laser beam have a substantially round shape. Consequently, the elevations can be generated by a round laser beam with technically little effort.

In a preferred embodiment of the invention, the elevations have a width of <100 μm, in particular of 50±20 μm. The width of the elevations is dependent on a track width of the machining track of the laser beam or on a spot diameter of the laser beam. As a result, a high structuring density of the elevations on the machined surface of the metal component can be achieved.

In a preferred embodiment of the invention, the elevations have a height of <20 μm, in particular of 5 μm. As a result, the friction value of the surface to be machined can be significantly increased with technically little effort.

In a preferred embodiment of the invention, the premachining on the surface to be machined of the metal component generates a surface structure which is oriented in the circumferential direction of the inner surface. As a result, premachining of the surface to be machined is possible with little effort by means of fine boring or fine grinding or else honing.

In a preferred embodiment of the invention, the inner surface is laser-structured in a plurality of spaced-apart angular sections. Consequently, individual sections of relatively large areas can be structured in order to locally increase a friction value of the surface, with the result that the effort required for structuring and the expenditure of time on machining the surface can be reduced. In addition, smooth, non-structured regions between the laser-structured areas of the component offer good heat dissipation from the bearing surface to the further component contours.

In a preferred embodiment, the laser structures, namely the elevations, are generated over a plurality of machining tracks of the laser, preferably in a plurality of straight, parallel lines, on the surface to be machined, with the machining tracks, preferably the straight, parallel lines, of overlapping elevations being spaced apart from one another. A spacing of at least 50% of the track width of the machining tracks is provided between directly adjacent machining tracks of the laser beam or directly adjacent lines of elevations. The track width of the machining tracks is <100 μm. In particular, the respective track width is 50±20 μm. An increase in the coefficient of friction in a predefined direction is possible with technically little effort.

Overall, the method allows a surface to be machined to be structured with technically little effort and accordingly allows the coefficient of friction of the surface to be increased, with the result that the surface to be machined can form a frictional connection with a surface of another component and thus the technical effort and the expenditure of time for connecting components to surfaces can be reduced.

By virtue of the fact that the premachined surface is laser-structured in such a way that elevations but no depressions are formed with respect to the level of the premachined surface, the defined roughness can be generated contactlessly on the surface with little expenditure of time, to be precise without the risk that the service life of the component is reduced.

It will be understood that the features mentioned above and those still to be explained below can be used not only in the combination specified in each case, but also in other combinations or in isolation, without departing from the scope of the present invention.

The metal component according to aspects of the invention, which is in particular a connecting rod or a cam of a motor vehicle, has a premachined surface which is laser-structured by means of a laser beam, wherein the premachined surface is laser-structured in such a way that elevations but no depressions are formed as laser structures with respect to the level of said surface.

BRIEF DESCRIPTION OF THE DRAWING FIGURES

Exemplary embodiments of the invention are illustrated in the drawing and are explained in more detail in the description which follows. In the drawing:

FIG. 4b shows a schematic illustration of the surface from FIG. 4a; and

DETAILED DESCRIPTION OF THE INVENTION

Figure 1:
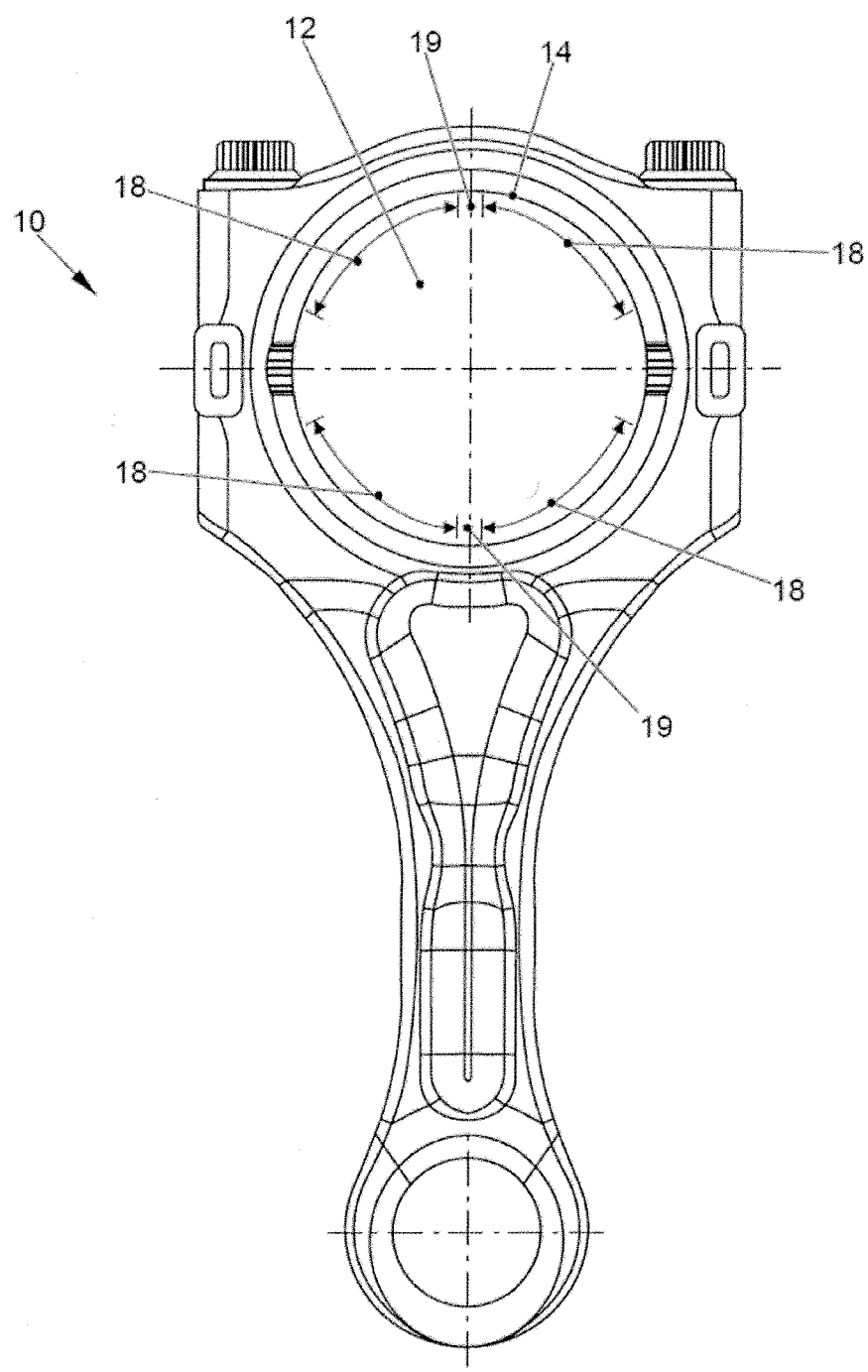
FIG. 1 shows a schematic view of a connecting rod having a surface to be machined.

A connecting rod of a motor vehicle is schematically illustrated in FIG. 1 and generally designated by 10. The connecting rod 10 is preferably formed from titanium or a titanium alloy. However, it can also be formed from steel. The connecting rod 10 has an aperture 12 which forms a large connecting rod eye. On the aperture 12 there is formed an inner surface 14 which forms a contact surface for a bearing shell of the connecting rod 10. The inner surface 14 forms an inner circumferential surface of the connecting rod eye.

The inner surface 14 is, like the connecting rod 10 itself, preferably formed form titanium or else from steel, with a frictional connection customarily being formed between a bearing shell (not shown here) and the inner surface 14. The bearing shell customarily forms a sliding bearing with a crankpin of a crankshaft.

In order to form a frictional connection between the inner surface 14 and the bearing shell, the inner surface 14 is customarily first of all premachined by means of fine boring so as to grind the aperture 12 to a predefined diameter.

Since this step of fine boring forms rectilinear structures on the inner surface 14 in the circumferential direction and the surface has a low coefficient of friction, according to the prior art the inner surface 14 must be roughened or be structured after the step of fine boring in order to achieve a defined and sufficient roughness.

For the purposes of the invention present here, after the premachining step, which is preferably one of fine boring, the inner surface 14, which preferably forms a titanium surface to be machined, is structured in a defined manner or roughened in a defined manner by means of a laser beam in order to achieve a corresponding roughness value for a frictional connection with the bearing shell. Here, the laser beam structuring takes place in such a way that elevations but no depressions are formed as laser structures on the premachined surface 14 with respect to the level thereof.

Figure 2:
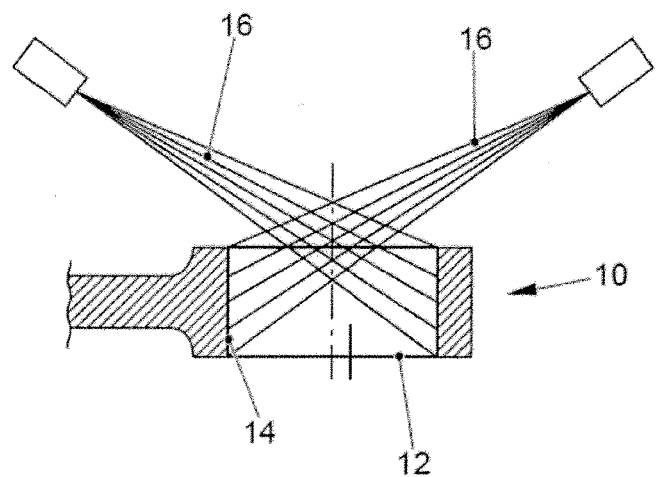
FIG. 2 shows a schematic sectional view of the connecting rod to explain the laser structuring.

FIG. 2 shows a schematic sectional view of the connecting rod 10 to explain the laser structuring. The inner surface 14 is irradiated by means of a laser beam 16 during the laser structuring such that corresponding laser structures are obtained by melting the surface consisting preferably of titanium and thus a structuring and a corresponding surface roughness can be achieved. Here, the laser beam 16 is a pulsed laser beam and preferably an Nd YAG laser beam. The laser beam 16 is preferably guided or moved along the surface 14 to be machined by a Galvo scanner with two mirrors.

The laser beam has a defined spot width. The inner circumferential surface 14 is preferably irradiated at different angular sections by the laser beam 16, which is moved in machining tracks along the circumferential surface 14 with a defined rate of advance, with individual spaced-apart structuring regions 18 or areas being generated on the inner surface 14. The track width of a machining track corresponds to the spot width of the laser.

Two structuring regions 18 are preferably generated on the inner surface 14, said structuring regions each spanning an angular section of 150° and each being separated from one another by a non-structured region 19 of 2°. Overall, there result four structuring regions 18 or structuring fields 18 which each cover an angular section of 74°, as is schematically illustrated in FIG. 1. The structuring regions are centrally oriented in the aperture 12, preferably in the axial direction of the aperture 12, in order to form a particularly symmetrical friction value.

In order, during laser beam structuring, to form exclusively elevations but no depressions as laser structures on the premachined surface 14 with respect to the level thereof, the preferably pulsed laser beam is operated, in the case of a steel component, with an average beam power of 9±0.5 watt. During the laser beam structuring of a steel component, the rate of advance of the pulsed laser beam is 500 to 700 mm/s, the pulse frequency of the pulsed laser beam is 40±3 kHz, and the pulse duration is approximately 5 μs. The track width of a machining track of the laser beam is 50±20 μm.

In the case of a titanium component, the preferably pulsed laser beam is operated with an average beam power of 8±0.5 watt. During the laser beam structuring of a titanium component, the rate of advance of the pulsed laser beam is 250 to 350 mm/s, the pulse frequency of the pulsed laser beam is 60±3 kHz, and the pulse duration is approximately 5 μs. The track width of a machining track of the laser beam is 50±20 μm.

Given such a material-dependent, average beam power, rate of advance, pulse frequency and pulse duration, a local melt occurs on the surface with the topography of the premachining where the laser beam inputs energy.

On cooling the melt, the topography of the premachining is not maintained, but, on account of the thermal expansion, there result raised structures and thus elevations or upward protuberances but no depressions with respect to the surface level of the premachined surface 14.

The raised structures fundamentally arise during the transition from the melt into the vapor phase. Owing to the cooling gradients which as it were freeze the instantaneous transition structure, there result fine upwardly directed ridges. In this context, the melt puddle is unsettled and gas inclusions occur which generate a lower density in the solidified melt, with the result that the volume balance is equalized and thus no depressions arise. Different parameterization can also result in depressions, but these are not relevant tribologically for the purpose of increasing the friction.

Figure 3:
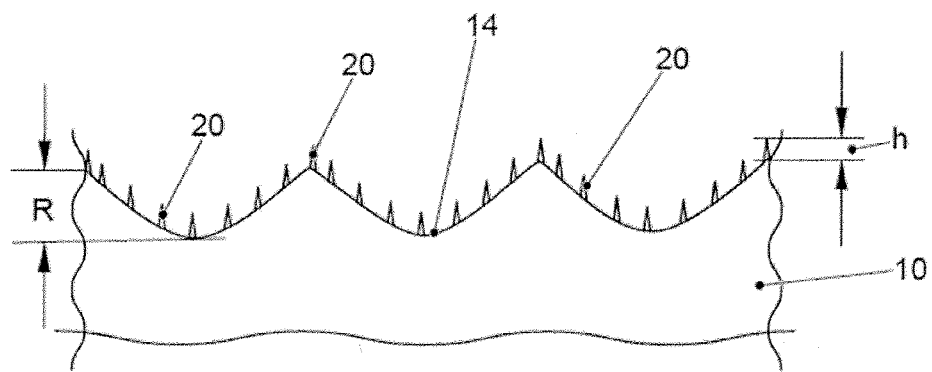
FIG. 3 shows a schematic sectional view of the surface after laser structuring.

FIG. 3 illustrates a schematic sectional view of the inner surface 14. The inner surface 14 has a uniform surface structure which is generated by the premachining step of fine boring and is oriented in the circumferential direction of the aperture 12. The surface structure has in general a height R, as is schematically illustrated in FIG. 3.

The inner surface 14 or the surface 14 of the aperture 12 also has a plurality of elevations or melt ridges 20 which have been generated by the laser structuring on the surface consisting preferably of titanium.

The elevations or melt ridges 20 have a height h which is up to 10 μm, in particular up to 5 μm. The elevations or melt ridges 20 can significantly increase the roughness of the surface consisting preferably of titanium, with the result that a frictional connection with another component, such as, for example, the bearing shell, is possible.

Figure 4A:
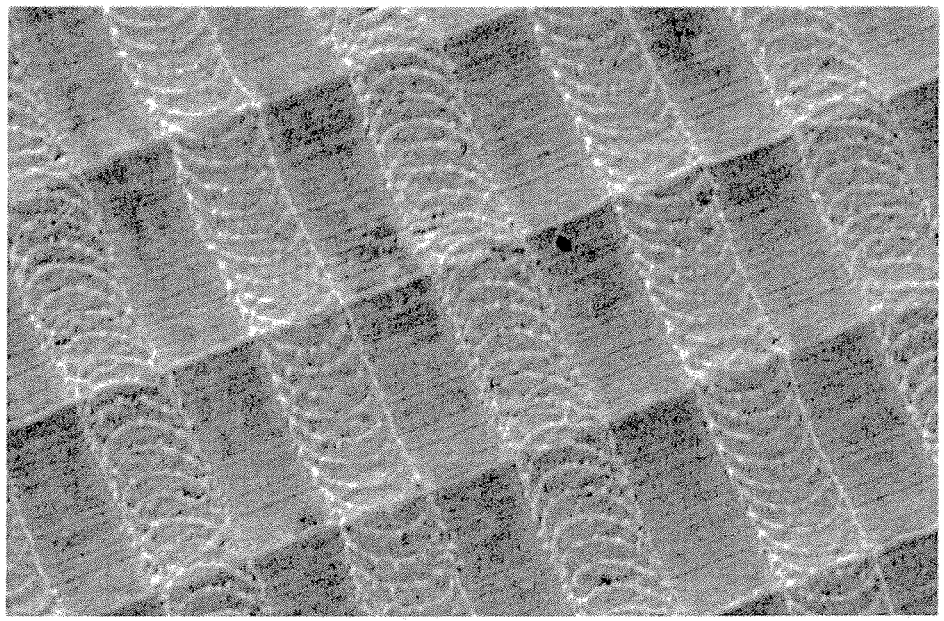
FIG. 4a shows an SEM image of a surface after laser structuring.
Figure 4B:
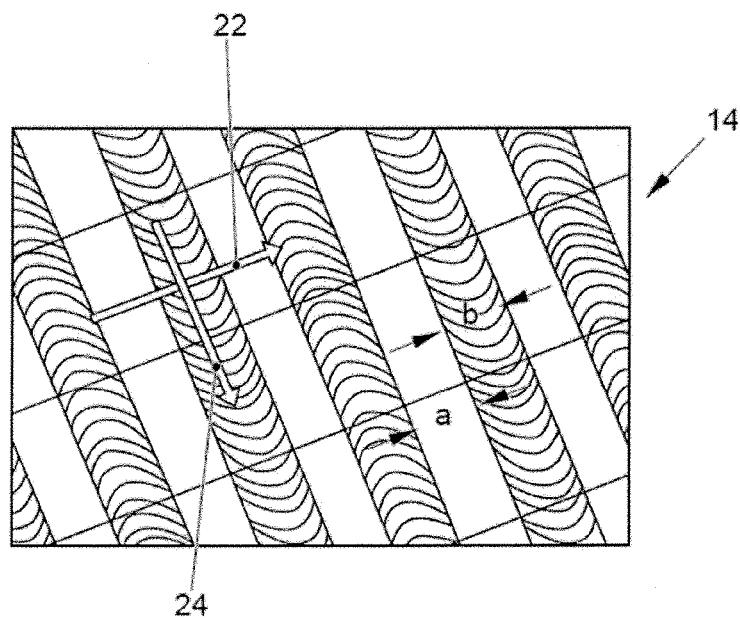

FIG. 4a illustrates a scanning electron microscope (SEM) image of the inner surface 14 and FIG. 4b illustrates a schematic view of this inner surface 14.

The surface structure which has been generated by fine boring is formed by parallel strips which are oriented in the circumferential direction of the aperture 12. The circumferential direction is schematically illustrated in FIG. 4b by an arrow 22.

The laser structures, namely elevations or melt ridges 20, which have been generated by the laser beam 16 on the inner surface 14 along the machining tracks of the laser beam 16, are formed as overlapping circular structures which are preferably formed in parallel rectilinear lines of respectively overlapping circular structures on the inner surface 14. The machining tracks or the rectilinear parallel lines are oriented orthogonally to the circumferential direction 22 and thus loading direction of the connecting rod in operation, as is shown by an arrow 24 in FIG. 4b.

The orientation of the laser structures on the inner surface 14 makes it possible to achieve an increased coefficient of friction in the circumferential direction 22, with the result that a rotationally fixed connection can be formed between the inner surface 14 and the bearing shell.

The circular laser structures, namely the elevations or melt ridges 20, or the parallel lines of respectively overlapping circular structures have a structure width b of 50±20 μm, preferably 65 μm.

The laser structures, namely the elevations or melt ridges 20, also have a spacing a of at least 50% of the track width of the machining tracks and thus of the structure width b, preferably a spacing a of 55 μm. The degree of overlap of the individual circular structures within each machining track is preferably 60% or 60-80%.

By virtue of the thus formed elevations or melt ridges 20 in circular laser structures which are arranged in an overlapping manner in rectilinear rows on the inner surface 14, the coefficient of friction of the surface of the aperture 12 can be significantly increased, with the result that a frictional connection with a second component, such as, for example, the bearing shell, can be formed.

Figure 5A:
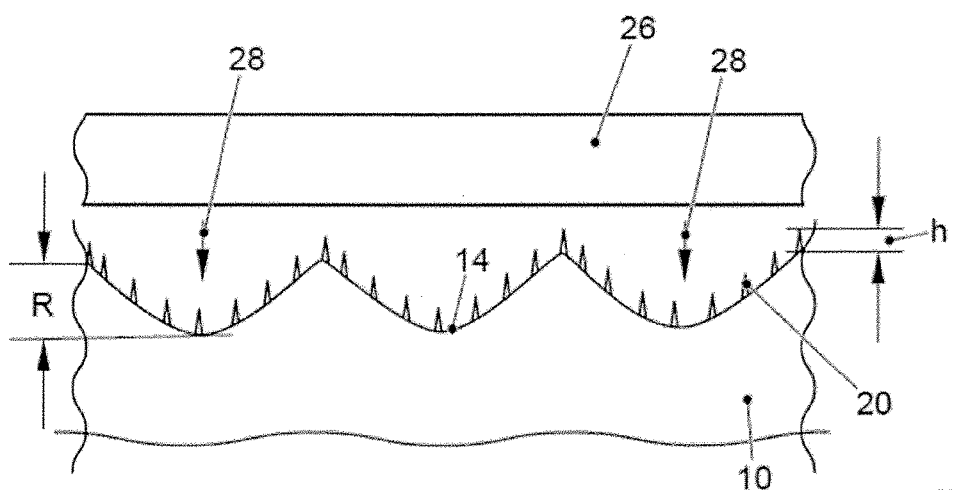
FIGS. 5a and 5b show a schematic sectional view of the structured surface to explain a frictional connection with a second component.
Figure 5B:
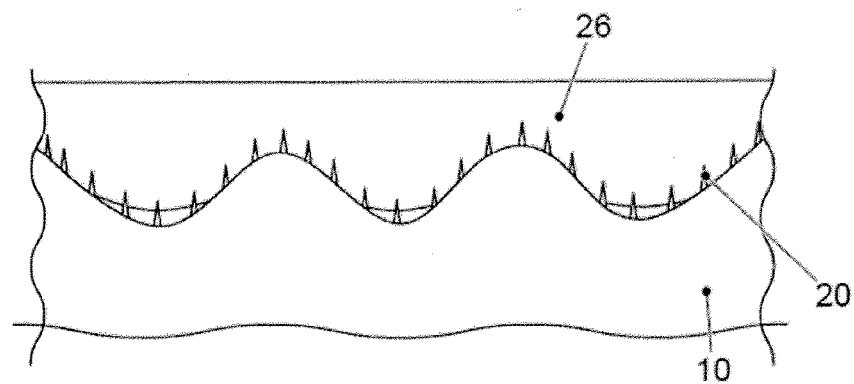

FIGS. 5a and 5b illustrate the inner surface 14 in a schematic sectional view together with the bearing shell 26. The bearing shell 26 is brought into contact with the inner surface 14, as is schematically indicated by arrows 28 in FIG. 5a, with the inner surface 14 forming a frictional connection with the bearing shell 26 by means of the laser ridges 20, as is shown in FIG. 5b. It is thereby possible for a rotationally fixed connection to be formed between the bearing shell 26 and the inner surface 14 with technically little effort, to be precise by the structuring by means of the laser beam 16.

It will be understood that the method for structuring the surface is also applicable for other surfaces, for example for cams which are intended to form a frictional connection with a shaft tube and together form a camshaft of a motor vehicle.

A metal component 10 according to aspects of the invention is particularly embodied as a connecting rod or cam of a motor vehicle. Said component has a premachined surface 14 which is laser-structured by means of a laser beam 16. The premachined surface 14 is laser-structured in such a way that elevations but no depressions are formed as laser structures with respect to the level of said surface.

The elevations are formed in a plurality of tracks of elevations on the surface 14 to be machined, said elevations being formed along the machining tracks of the laser beam.

The elevations have an overlap of preferably 60-80% within a track, with directly adjacent tracks of elevations being spaced apart free of overlap.

The metal component is preferably a titanium component, in particular a titanium connecting rod of an internal combustion engine.

What is claimed is:

1. A method for machining a surface of a metal component, comprising:
   machining a surface on a metal component and forming rectilinear structures in a circumferential direction, and
   structuring the machined surface using a laser beam, wherein the machined surface is laser-structured in such a way that elevations but no depressions are formed as laser structures with respect to a level of said surface, and the elevations are arranged in a row that is orthogonal to the rectilinear structures.

2. The method as claimed claim 1, wherein the surface is an inner surface of an aperture in the metal component, wherein the laser beam is guided in a direction orthogonal to the circumferential direction of the inner surface.

3. The method as claimed in claim 1, wherein the laser beam is operated in a pulsed manner along at least one machining track over the surface.

4. The method as claimed in claim 3, wherein the elevations which are formed within a machining track are formed in an overlapping manner on the surface and have an overlap of greater than or equal to 60 percent.

5. The method as claimed in claim 3, wherein the elevations are generated in a plurality of machining tracks of respectively overlapping elevations on the surface, wherein the machining tracks are spaced apart from one another free of overlap and have a spacing of at least 50 percent of a track width of the machining tracks.

6. The method as claimed in claim 3, wherein the metal component is a steel component, the machined steel surface of which is laser-structured with an average beam power of 9±0.5 watt.

7. The method as claimed in claim 3, wherein the metal component is a titanium component, the machined titanium surface of which is laser-structured with an average beam power of 8±0.5 watt.

8. The method as claimed in claim 1, wherein the elevations have a round shape.

9. The method as claimed in claim 1, wherein the elevations have a width of less than 100 μm.

10. The method as claimed in claim 1, wherein the elevations lave a height of less than 20 μm.

11. The method as claimed in claim 1, wherein the surface is an inner circumferential surface and the machining on the surface generates a surface structure which is oriented in the circumferential direction of the inner circumferential surface.

12. The method as claimed in claim 11, wherein the inner circumferential surface is laser-structured in a plurality of spaced-apart angular sections.

13. The method as claimed in claim 1, wherein the metal component is a connecting rod for a motor vehicle.

14. The method as claimed in claim 1, wherein a height (R) of the rectilinear structures is greater than a height (h) of the elevations.

15. The method as claimed in claim 1, wherein a plurality of elevations are disposed between adjacent rectilinear structures.

16. The method as claimed in claim 1, wherein the elevations are arranged in a plurality of rows and the rectilinear structures are also arranged in a plurality of rows, and the plurality of rows of elevations are orthogonal to the plurality of rows of rectilinear structures.

* * * * *

UNITED STATES PATENT AND TRADEMARK OFFICE
CERTIFICATE OF CORRECTION

PATENT NO. : 10,309,447 B2
APPLICATION NO. : 15/468686
DATED : June 4, 2019
INVENTOR(S) : Peter Wels et al.

Page 1 of 1

It is certified that error appears in the above-identified patent and that said Letters Patent is hereby corrected as shown below:

On the Title Page

At (71) Applicants, "Akteingesellschaft" should read -- Aktiengesellschaft --.

At (73) Assignee, -- Gehring Technologies GmbH (DE) -- should be included with Dr. Ing. h.c. F. Porsche Aktiengesellschaft (DE).

Signed and Sealed this
Twenty-third Day of July, 2019

Andrei Iancu
*Director of the United States Patent and Trademark Office*